Dec. 12, 1967  M. P. BAZACOS  3,357,116

MATHEMATICS TEACHING DEVICE

Filed April 16, 1965

INVENTOR.
MARYCAROL P. BAZACOS
BY
Julian Caplan
ATTORNEY

United States Patent Office 3,357,116
Patented Dec. 12, 1967

3,357,116
MATHEMATICS TEACHING DEVICE
Marycarol P. Bazacos, 6 Thomas Lane,
Chico, Calif. 95926
Filed Apr. 16, 1965, Ser. No. 448,813
1 Claim. (Cl. 35—31)

The present invention relates to a new and improved device for aiding in teaching the basic concepts of numbers and mathematics.

The present device consists essentially of a display face upon which appear sets of colored markings, with a peg in proximity to each set of markings. Removable numerals having a value equal to the number of markings in each set are to be placed on the peg corresponding to the appropriate set. The removable numerals may be color coded to match the color of the correct set of markings. The numbers may additionally be graduated in size corresponding to the value of each numeral or may be all of equal size and color.

A principal object and advantage of the present invention is to provide a simple and easily used device to aid elementary school teachers and parents in teaching the fundamental concepts of numerals and mathematics to young children. The present teaching device combines the elements of a game with the transmission of the ideas which form the basis for all further arithmetic study. The child's limited attention span for learning is expanded by the combination of play and learning in a single device.

Another advantage of the invention is that the teaching device can be used at a number of stages of learning which become progressively more difficult and advanced. It can be used with equal advantage by children of the same age but differing abilities or by children at various levels of advancement.

An additional feature of this teaching device is that it utilizes existing abilities to make a comparison between the value of numbers and the size of objects identified by those numbers.

A still further advantage of this invention is that it makes use of a child's ability to compare colors, thereby enabling the child to identify a colored numeral with a plurality of objects of that same color which are associated with the numeral.

A further feature of the present teaching device is that it provides an easy identification between a numeral and a corresponding number of objects identified by that numeral, thereby instilling a sense of basic numerical relationships.

A still further advantage of the invention is the provision of means whereby the child himself can easily and quickly check and correct his solutions by comparison with a set of correctly arranged numbers.

An additional advantage of the device is the provision of polarizing means whereby it is impossible for numerals to be placed backwards.

Other features of this invention are: it is of the most basic construction and is easily and cheaply constructed; it is of simple and durable design and is capable of withstanding long and hard use; it is not susceptible of being easily broken or damaged; and it is capable of being utilized by two students at the same time.

Other objects of the present invention will become apparent upon reading the following specification and referring to the accompanying drawings in which similar characters of reference represent corresponding parts in each of the several views.

The present invention serves as an aid to teaching basic mathematical concepts by means of a child's inherent ability to compare objects as to color and size. It is intended to be a child's first introduction to numbers. The theory of numbers is purely philosophical. For a child to grasp the relationship between a number and a quantity of objects represented by that number, some concrete and physical means are needed to bridge the initial gap in comprehension. This device serves to form the necessary introduction for the child to the study of mathematics and numbers.

The basic structure is composed of rectangular baseboard 11 with rectangular backboard 12 mounted substantially vertically thereon. Boards 11 and 12 may be composed of wood, plastic, metal, or any other suitably durable material. Backboard 12 is mounted centrally along the length of baseboard 11 and is affixed firmly to baseboard 11 by means of a miter joint 13 or any other suitable means. Backboard 12 may also be removably affixed to baseboard 11 to provide for flat storage or shipping.

Figure 4:
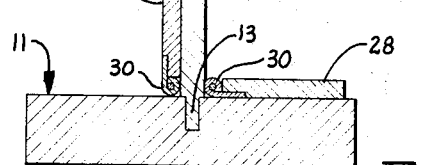
FIG. 4 is a sectional view taken substantially along line 4—4 of FIG. 3.

A plurality of hooks or pegs 15 are affixed at equidistant points along face 16 of backboard 12, approximately two-thirds of the distance upwardly from the surface of baseboard 11. Pegs 15 extend outwardly from the surface of backboard 12, as shown in FIG. 4.

Placed centrally above each peg 15 are a set of colored objects 20, here shown as colored dots or circles. In the form shown herein, nine pegs 15 are mounted on face 16 of backboard 12. Each peg 15 is adapted to receive a numeral 21 which is removably placed thereon. The outer extremity of each peg 15 is blunt or rounded in end 18 so as not to provide a sharp edge which could injure the child.

Figure 1:
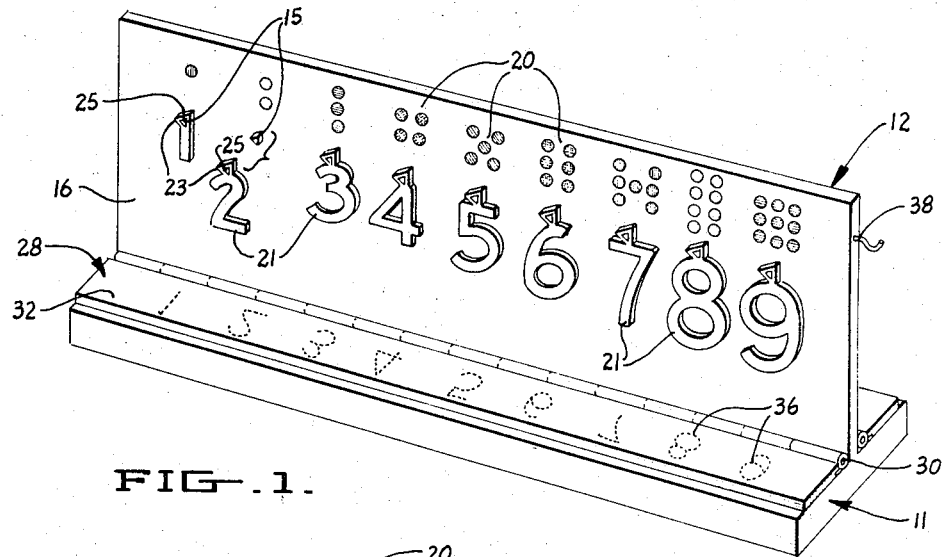
FIG. 1 is a perspective view of a mathematics teaching device embodying the present invention, with numerals of graduated size.

In the form shown in FIG. 1, a plurality of numerals 21 is provided, equal in quantity to the number of pegs 15 affixed to face 16. In the form shown herein, nine numerals 21 are provided from the number "one" to "nine." Each numeral 21 is formed of plastic, metal, wood, or any other suitable material and is preferably fabricated of thin material. Formed at the upper extremity of each numeral 21 is a loop 23 enclosing an aperture 25. Aperture 25 is of a shape to match the shape of peg 15 such that numeral 21 may be slidably placed on peg 15.

Pegs 15 and apertures 25 are polarized such that numerals 21 may be placed on pegs 15 in only one position. This prevents the child from placing a numeral 21 backwards on the backboard 12. In the form shown in FIGS. 1 and 2, pegs 15 and apertures 25 are triangular in cross-section, with the apex of the triangle facing to the left when facing backboard 12. Thus, if the child reverses a numeral, it is impossible for him to attach it to peg 15 backwards. Since this device is intended to be the child's first introduction to numbers, this polarization of pegs 15 eliminates the possibility that the child would become confused as to the proper configuration of numbers.

In the form shown in FIG. 1, numerals 21 are graduated in size relative to each other, the numeral "one" being the smallest, and progressing in size up to the numeral "nine," which is the largest in size. This size gradation according to the numeral value of each numeral 21 enables the child to comprehend the relative value of the numbers by means of the child's existing ability to compare objects as to physical size. Above each peg 15 are a plurality of objects 20 mounted or painted on face 16 of backboard 12.

The number of objects 20 corresponds to the value of the numeral 21 to be placed on each peg 15. The child counts the number of objects 20 above each peg 15 and hangs the appropriate numeral 21 on that peg. The gradation in size of numerals 21 serves as an aid to the child in determining the relative value of the numerals 21.

Once the child has hung each of the numerals 21 on a peg 15, he may check the correctness of his placements by means of answer board 28. Answer board 28 is of a rectangular shape, having its longer side equal in length to the length of backboard 12 and having its shorter side approximately one fourth the height of backboard 12. Answer board 28 is hingedly affixed along its length to the intersection of face 16 of backboard 12 with the upper side of baseboard 11 by means of hinge 30. In the down position, upper face 32 of answer board 28, which is blank, is exposed. When answer board 28 is rotated to its up position, it lies flush with face 16 of backboard 12 and the underside face 34 is exposed. Inscribed on or affixed to underside face 34 of answer board 28 are numbers 36 corresponding to the value of the numerals 21 which were hung on pegs 15. Numbers 36 are spaced so as to appear immediately below the peg on which the correct numeral 21 was to be placed. This enables the child to visually compare the numerals 21 he has placed on pegs 15 with the correct numbers 36 appearing on face 34 of answer board 28. Provision may be made such that answer board 28 falls to the down position by its own weight or by spring means when not held in the up position, thus preventing the correct answers from remaining visible unless the child holds answer board 28 in place.

Figure 2:
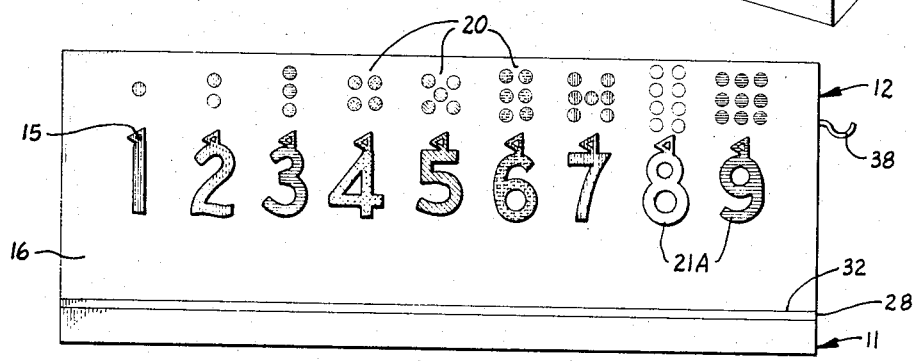
FIG. 2 is a front elevation of the device shown in FIG. 1, showing numerals color coded and of equal size.

Sets of objects 20 which are placed on face 16 of backboard 12 are colored, with a different color for each set of objects 20 appearing above the corresponding peg 15. For example, in FIG. 1 colored circle 20 would be red; the set of two-colored circles 20 appearing above the second peg 15 would be green, etc. up to the ninth peg 15. This color coded system is to be used with the modification of numerals 21 as shown in FIG. 2, in which the modified form of numerals are identified as 21A. Numerals 21A are each of a different color and the color of each matches the color of the sets of objects 20 on backboard 12. Thus, the child is aided in placing the correct numerals 21A on pegs 15 by matching the color of the numeral 21A with the color of sets of objects 20 which appear above each peg 15. In addition, colored numerals 21A may be graduated in size as shown in FIG. 1 to further aid the child in establishing numerical relationships.

Figure 3:
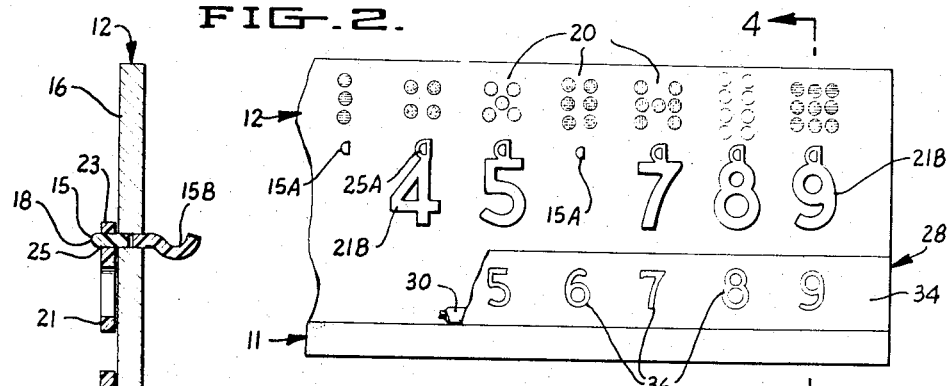
FIG. 3 is a partial front elevation of the device shown in FIG. 1, showing numerals all of equal size and all of the same color.

In the modification shown in FIG. 3, numerals 21B are all of the same size and color. This modification is intended to be the last step in the progression of difficulty which extends from (1) colored numerals 21A of progressive sizes to (2) colored numerals 21A of equal size, (3) numerals 21 of the same color but progressive sizes to (4) numerals 21B of the same color and equal size. Each of these four modifications of numerals may be interchangeably used with the present device as the pupil progresses in understanding.

A modification of pegs 15 is shown in FIG. 3 in which pegs 15A are polarized by being formed the shape of half-circles to prevent backward placement of numerals as well as presenting no sharp surfaces on which the child might be hurt. Apertures 25A are formed of a shape to match pegs 15A.

It is apparent that numbers greater than "nine" may be utilized with the present invention, and also that objects 20 and correct answers 36 may be made removable and replaceable so that the basic device may be used with any desirable value of numerals 21.

As shown in FIG. 4, an identical set of pegs 15, objects 20, and answer board 28 may be mounted on the reverse face 40 of backboard 12 to enable two students to use the device at one time, thereby doubling its effectiveness.

The result is a mathematics teaching tool which effectively conveys to a child the basic concepts of numerical relationships and is capable of being used with differing sets of numerals 21 as the child progresses.

A variation of peg 15 is shown as 15B in FIG. 4. Peg 15B is formed at its outer extremity in the shape of a hook to prevent numeral 21 from easily falling off.

Hook 38 is shown in FIG. 1 attached to the side surface of backboard 12 to provide support means for a container for numerals 21, 21A and 21B.

Although the foregoing invention has been described in some detail, by way of illustration and example for purposes of clarity of understanding, it is understood that certain changes and modifications may be practiced within the spirit of the invention and scope of the appended claim.

What is claimed is:

A mathematics teaching device comprising:
a backboard having a display face,
means supporting said backboard,
a plurality of sets of indicia on said face of said backboard, the number of said indicia in each said set corresponding to the value of a removable numeral to be placed adjacent said indicia,
a set of removable numerals to be placed on the face of said backboard,
and attachment means by which said numerals may be placed on the face of said backboard, each in proximity to one of said sets of indicia, and
which further comprises correction means, said correction means comprising a rigid leaf, a hinge attaching said leaf to said backboard, said leaf in its normally closed position exhibiting a blank upper face, said leaf in its raised position exposing its underside face, said underside face having answer numbers thereon corresponding to the number of indicia in a set appearing adjacent said answer number when said underside face is exposed.

References Cited

UNITED STATES PATENTS

| | | | |
|---|---|---|---|
| 1,151,279 | 8/1915 | Lewis | 35—73 |
| 1,343,721 | 6/1920 | Herrmann | 35—73 |
| 2,971,275 | 2/1961 | Provenzano | 35—31.4 |
| 3,002,295 | 10/1961 | Armstrong | 35—70 |

FOREIGN PATENTS

| | | |
|---|---|---|
| 165,862 | 2/1934 | Switzerland. |
| 33,055 | 2/1928 | France. |

EUGENE R. CAPOZIO, *Primary Examiner.*

W. GRIEB, *Assistant Examiner.*